United States Patent [19]

Barrett et al.

[11] Patent Number: 4,768,049
[45] Date of Patent: Aug. 30, 1988

[54] STEREOSCOPIC CAMERA SLIDE BAR

[75] Inventors: Edward A. Barrett, Finleyville; Marion B. Molchen, Washington; Henry J. Kellner, West Mifflin, all of Pa.

[73] Assignee: The United States of America as represented by the Secretary of the Interior, Washington, D.C.

[21] Appl. No.: 2,595

[22] Filed: Jan. 12, 1987

[51] Int. Cl.[4] .............................................. G03B 17/00
[52] U.S. Cl. .................................................... 354/294
[58] Field of Search .................. 354/81, 82, 112, 293, 354/294, 202

[56] References Cited

U.S. PATENT DOCUMENTS

| | | | |
|---|---|---|---|
| 1,674,540 | 6/1928 | Bagley | 354/202 X |
| 2,279,443 | 4/1942 | Chanosky | 354/112 |
| 2,791,950 | 5/1957 | Oppenheimer | 354/294 |
| 3,550,519 | 12/1970 | Lewis | 354/293 |
| 3,586,278 | 6/1971 | Simons | 354/81 X |
| 3,800,307 | 3/1974 | Wechsler | 354/112 |

Primary Examiner—Donald A. Griffin
Attorney, Agent, or Firm—E. Philip Koltos

[57] ABSTRACT

The present invention relates to a stereoscopic/35 mm camera slide bar which allows for the precise positioning of just one SLR camera at each of two pre-set locations. Individual slides are then taken in successive order using standard ASA slide film. Compatible lens, ranging from zoom to wide angle, can be utilized to suit the occasion. The unit basically consists of three horizontal bars situated one above the other. The lower bar is used for mounting on a tripod and for holding a simple line level. The middle bar holds the camera which is attached to a track-mounted sliding plate and the upper bar supports a strobe light. The flash is secured at a location central to each camera positon. The upper bar has the flexibility of vertical elevation so that the light can be accurately directed to the subject.

9 Claims, 2 Drawing Sheets

U.S. Patent  Aug. 30, 1988  Sheet 3 of 3  4,768,049
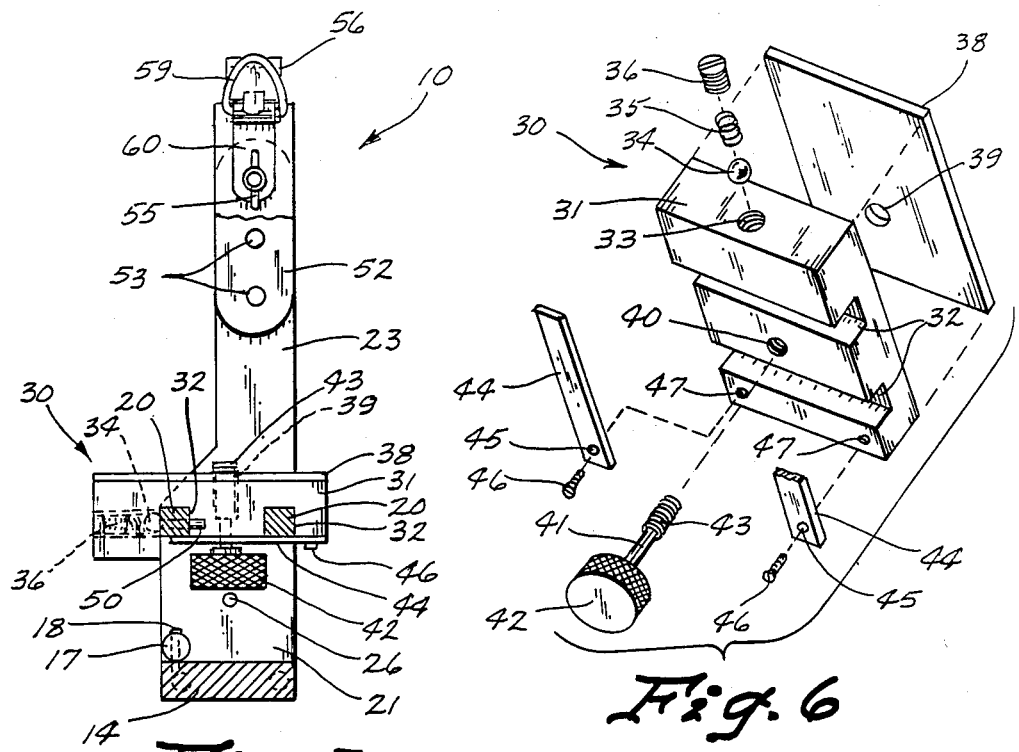
Fig. 5
Fig. 6
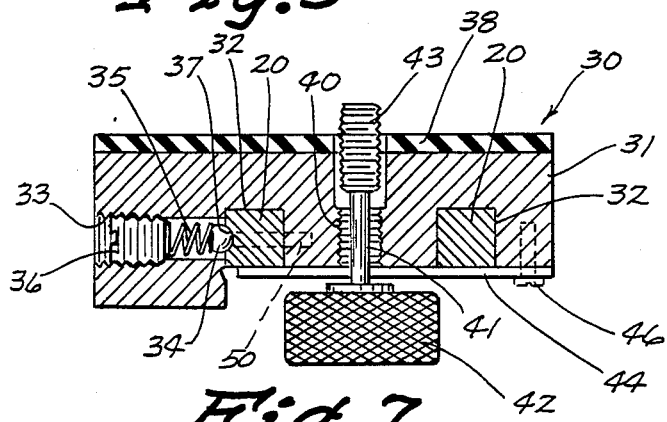
Fig. 7

STEREOSCOPIC CAMERA SLIDE BAR

TECHNICAL FIELD

The present invention relates to the making of a matched pair of standard 35 mm slides that may be combined into a three dimensional slide to be looked at in handheld viewers or projected onto a screen and more particularly to a camera slide bar apparatus for attachment to a tripod for accurately taking the slide pair.

BACKGROUND ART

Authentic stereoscopic slide cameras have not been manufactured for more than 30 years and those available are old-fashioned, mechanical units that have several operational limitations. These include dual built-in lens that are not changeable, mechanical camera controls, exclusion of built-in level indicators (level camera is essential for taking good 3D slides) and difficult focusing adjustments, particularly in a dark environment. Other important 3D camera shortcomings include limited availability, due to current non-manufacture, and relatively high slide development costs.

A quality, well designed 35 mm camera slide bar can be effectively utilized to overcome deficiencies noted above and to produce 3D slides. A wide variety of slide bars can be found in camera shops. All are designed to contain two 35 mm cameras mounted horizontally and fired simultaneously by a twin cable release. Each camera holds its own strobe light in the standard hot shoe mounting position.

The efficacy of these slide bars is uncertain since they have never been designed for optimum performance. For example, because of typical 35 mm camera body dimensions, the closest possible horizontal positioning of the two lens is approximately six inches on center. This distance exceeds the desired lens spacing of $2\frac{3}{4}$ inches found on stereoscopic cameras. Also, firing two cameras at exactly the same time is nearly impossible since the cable release is simply a mechanical pin with standard tapered threads. Synchronization is theoretically possible, but is very difficult to achieve. Unequal firing causes variable lighting in each slide that results in exposure and indiscriminate shadow problems.

Since the commercial slide bars found in camera shops have obvious shortcomings, there is a need for an improved slide bar which can be utilized to accurately take a pair of slides using a single camera.

DISCLOSURE OF THE INVENTION

The present invention relates to a stereoscopic/35 mm camera slide bar which allows for the precise positioning of just one SLR camera at each of two pre-set locations. Individual slides are then taken in successive order using standard ASA slide film. Compatible lens, ranging from zoom to wide angle, can be utilized to suit the occasion. The unit basically consists of three horizontal bars situated one above the other. The lower bar is used for mounting on a tripod and for holding a simple line level. The middle bar holds the camera which is attached to a track-mounted sliding plate and the upper bar supports a strobe light. The flash is secured at a location central to each camera position. The upper bar has the flexibility of vertical elevation so that the light can be accurately directed to the subject.

An object of the present invention is to provide an improved slide bar apparatus for taking matched pairs of slides that can be combined into 3D slides.

Another object of the present invention is to provide an apparatus of the aforementioned type which can be used to take a pair of slides while utilizing only one camera.

A further object of the invention is to provide an apparatus of the aforementioned type which does not require synchronization of two cameras.

A still further object of the present invention is to provide a slide bar which allows the user to control the distance between two camera positions and taking slides through a large range of adjustment.

A further object is to provide a fixed strobe light position to insure that the lighting in each slide is identical and that the problem of irregular shading is eliminated.

A still further object is to provide an apparatus of the aforementioned type which maintains the camera level at all times in a simple and dependable manner which prevents the camera from turning about a vertical axis.

Other objects, advantages and novel features of the present invention will become apparent from the following detailed description of the invention when considered in conjunction with the accompanying drawings.

BRIEF DESCRIPTION OF THE DRAWINGS

FIG. 5 is a cross sectional view taken along line 5—5 of FIG. 4;

FIG. 6 is an exploded perspective view of the slide bar assembly; and

FIG. 7 is an enlarged cross sectional view taken along line 7—7 of FIG. 3.

BEST MODE FOR CARRYING OUT THE INVENTION

Figure 1:
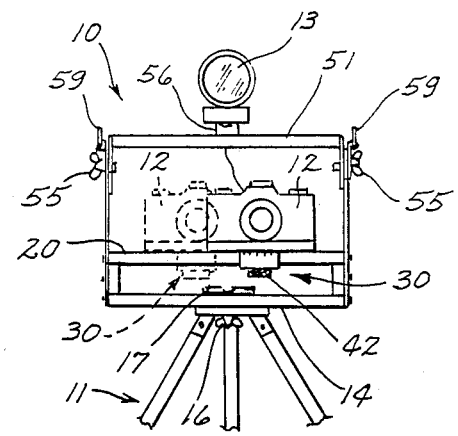
FIG. 1 is a front view of a preferred embodiment of the slide bar apparatus of the present invention shown in use a camera and tripod attached thereto.
Figure 2:
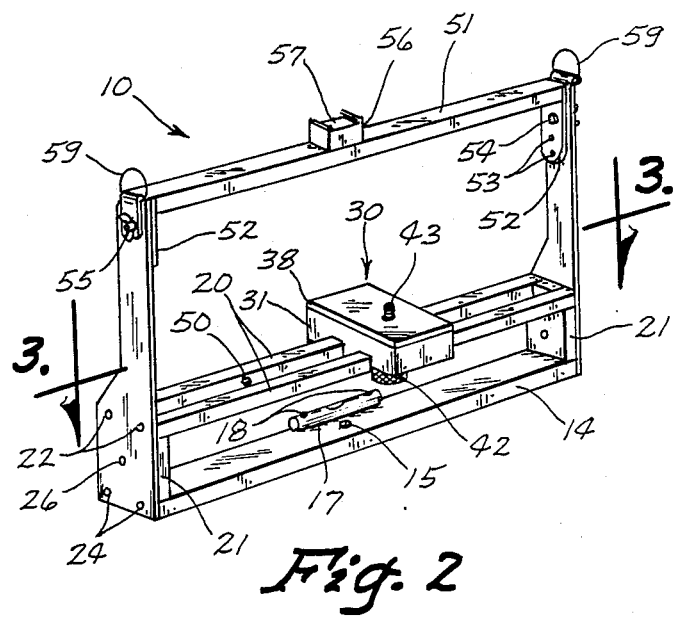
FIG. 2 is a perspective view of the slide bar apparatus.

Referring now to the drawings wherein like reference numerals designate identical or corresponding parts throughout the several views, FIGS. 1 and 2 show a preferred embodiment of a slide apparatus (10) constructed in accordance with the present invention. In FIG. 1, the apparatus (10) is attached to the top of a tripod (11) and has a camera (12) attached thereto and a flash or strobe light (13) attached to the top thereof.

Referring to FIG. 2, a first horizontally disposed member (14) has a threaded hole (15) at the center thereof for receiving a threaded post connected to the wing member (16) on the tripod (11). A mechanism (17) for determining whether the first member (14) is level is of a conventional type including a liquid having a bubble therein so that centering the bubble within the liquid will determine when the member (14) is level. The level determining mechanism (17) is attached by threaded fasteners (18) to the first horizontally disposed member (14).

A pair of slide bars (20) are parallel to the first horizontally member (14) and are held in place by block members (21) at each end thereof. These block members

(21) have notches on each top corner thereof for positioning the rails (20) in place and threaded fasteners (22) which extend through brackets (23) on each end of the apparatus (10) and into the blocks (21) hold the rails (20) securely in place. The brackets (23) are held in place also by fasteners (24) which extend through the bottom of the bracket (23) and are threadably engaged into the first horizontally disposed member (14) on each end thereof. Another fastener (26) of a threaded type extends through the brackets (23) and into threads in each of the block members (21). Consequently, the structure just described securely anchors the rails (20) which form a slide bar parallel to the first horizontally disposed member (14).

Figure 3:
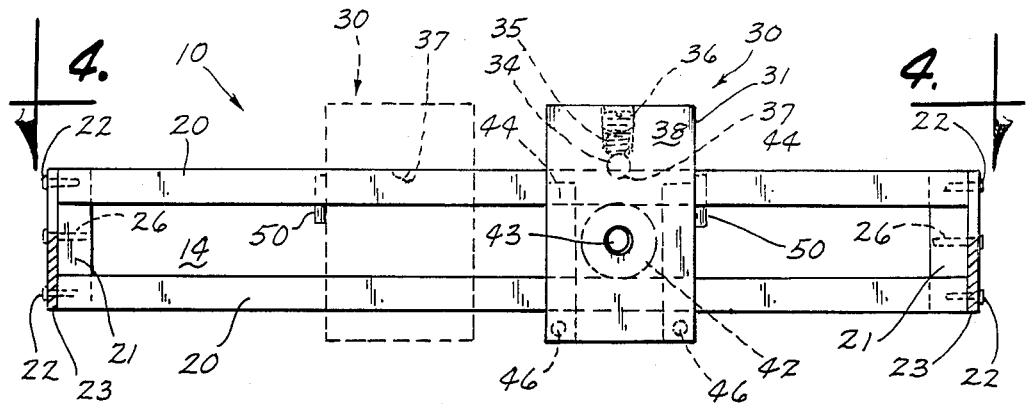
FIG. 3 is a cross sectional view taken along line 3—3 of FIG. 2.

A slide bar assembly (30), which can best be seen in FIG. 6, includes a block member (31) having a pair of slots (32) disposed therein rides on the rails (20), for example as shown in FIGS. 2 and 3. The rails (20) extend into the grooves (32).

An opening (33) which is threaded at the top thereof has a steel ball (34) disposed therein and has a helical compression spring (35) which abuts the ball (34) at one end thereof and abuts a threaded plug (36) at the other end thereof such that the spring (35) biases the ball (34) toward the one of the rails (20) which has depressions (37) formed therein.

A rubber pad (38) is glued to the top of the block (31) and has an opening (39) therein which is aligned with a threaded opening (40) in the center of the block (31). A post (41) having a handle (42) on one end thereof and a threaded portion (43) on the other end thereof is threadably received through the opening (40) in block (31) and extends upwardly through the opening (39) in rubber pad (38) as can best be seen in FIGS. 2 and 7.

Bars (44) having openings (45) in one end thereof are held in place against a block (31) by threaded fasteners (46) which threadably engage openings (47) in the block (31). By loosening the threaded fasteners (46), the bars (44) can be pivoted to one side, so that they do not interfere with placement of the block into the position shown in FIGS. 2 and 3 wherein the rails (20) extend into the grooves (32) in the block (31). Once the block (31) is in the position shown in FIGS. 2 and 7, then the bars (44) can be pivoted back to the position shown in FIG. 7 and threaded fasteners (46) can be tightened down so that the block (31) will not come off of the rails (20) until it is desired to take it off. At the same time, the bars (44) do not interfere with the ability of the block (31) to slide from side to side on the rails (20).

Referring also to FIG. 3 it is noted that stops (50) secured to one of the rails (20) are placed to prevent the block (31) from moving beyond the position shown in solid and dashed lines in FIG. 3. But it is also noted that these stops (50) could be placed at other positions or could be adjustable along the length of the rail (20). The stops (50) are designed to correspond with the position of the steel ball (34) and depression (37) so that when tne block (31) is moved to the position shown in FIG. 3 whereby the block (31) contacts the stop (50); at the same time, the ball (34) will extend into the depression (37) to hold the block (31) in place. But when it is desired to move the block (31) to the position shown in dashed lines in FIG. 3, the steel ball (34) will roll along the rail (20) until it drops into the other depression (37), which will be at the same time that the block (31) abuts the stop (50).

Figure 4:
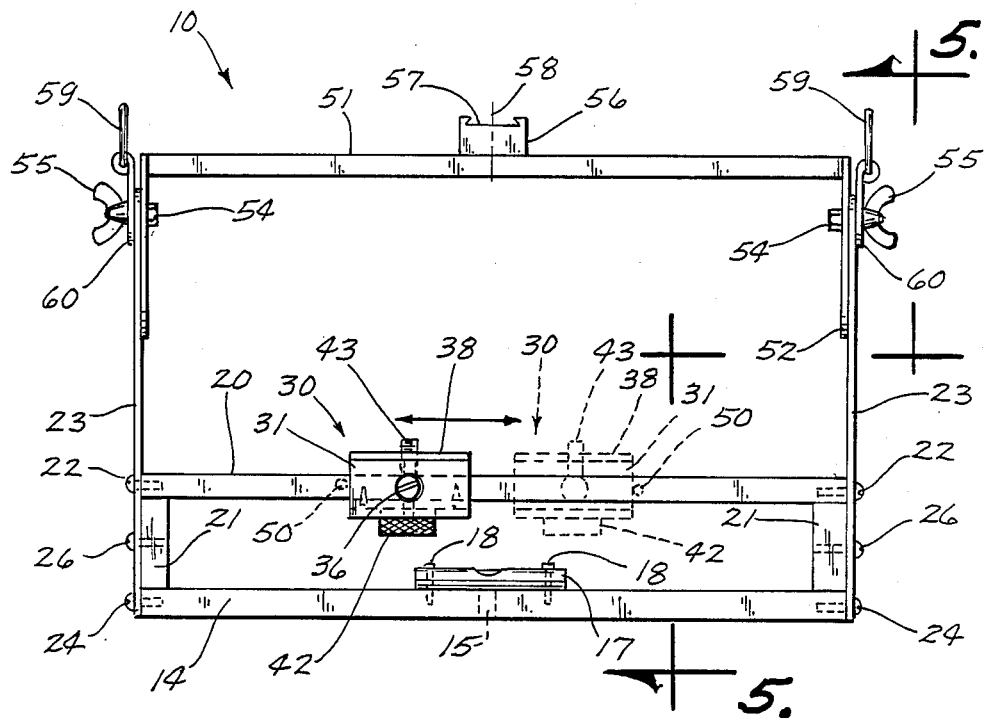
FIG. 4 is a view taken along line 4—4 of FIG. 3.

A support beam (51) is welded to downwardly extending flanges (52) which have a plurality of openings (53) therein. Bolts (54) can be fastened to the position shown in FIGS. 2 and 4 by wing nuts (55). A shoe (56) having a dovetail slot (57) in the top thereof is secured along center line (58) to the beam (51) for reasons which will be explained below. Loops (59) are pivotally attached to wire members (60) which are also held in place by the bolt (54) and wing nut (55) so that a strap can be connected from one loop (59) to the other loop (59) to facilitate carrying the apparatus (10) from place to place.

In operation, the slide bar apparatus (10) would be first assembled as shown in FIG. 2 and then attached to the tripod (11) by aligning the opening (15) with the threaded member connected to the wing member (16) of the tripod and turning the wing member (16) until the first horizontally disposed member (14) is secured against the top of the tripod (11). The legs of the tripod (11) can then be adjusted to make sure that the slide bar (14) is level, by referring to the level indicating mechanism (17). Then a 35 mm camera (12) having a threaded opening at the bottom thereof is attached to the block (31) by placing it in the position shown in FIG. 1 and then turning the knob (42) until the camera is securely held against the rubber pad (38). Also, a flash mechanism (13), sometimes referred to a strobe light (13), is secured into the shoe (56) in a well known fashion. Typically, the strobe light (13) is electrically connected to the camera (12).

In order to take three dimensional slides, a camera (12) is first used to take a picture on slides using slide film when camera (12) is in the position shown in FIG. 1 and the block (31) is in the position shown in solid lines in FIG. 3. After that picture is taken, then the film is advanced and the camera moved to the position shown in dashed lines in FIG. 1 and the block (31) would correspondingly be moved to the position in dashed lines in FIG. 3 wherein the block (31) is against the stop in (50) and the ball (34) holds the block (31) in place because of its engagement in the depression (37). Then a second slide picture can be taken. Because the strobe light (13) is held exactly above the center line between the two camera positions shown in solid and dashed lines in FIG. 1, the lighting will be identical in each slide.

Accordingly it will be appreciated that all of the above mentioned objects are achieved by utilizing the preferred embodiment shown in these drawings and just described. Obviously many modifications and variations of the present are possible in light of the above teachings. It is therefore to be understood that, within the scope of the appended claims, the invention may be practiced otherwise than as specifically described.

We claim:

1. A slide bar apparatus for taking three dimensional slides comprising:
 a first horizontally disposed member;
 means on said first member for attaching said first member to a tripod;
 a slide bar, at least a top portion of said slide bar being horizontally disposed;
 means for attaching said slide bar to said first member in a position above said first member;
 slide bar assembly means operably attached to said slide bar for movement between a first position and a second position thereof, said slide bar assembly having a bore disposed therein;
 means for selectively and releasably holding said slide bar assembly means in the first or the second position thereof, said holding means comprising a first and second depression on said slide bar assembly means and a detent member reciprocally disposed in said bore in the slide bar assembly means, means for biasing said detent member toward said slide bar, said slide bar assembly means having a first position wherein said detent member is disposed in said first depression and a second position wherein said detent member is disposed in said second depression whereby said slide bar assembly means will be held securely in either said first or second position and can quickly and easily be moved between said first and second positions thereof; and means for selectively and releasably attaching a camera to said slide bar assembly means.

2. The apparatus of claim 1 including support means operably attached to at least one of said first member and said slide bar for connection to a strobe light.

3. The apparatus of claim 2 including means for attaching said strobe light centrally between and above said first and second positions of said slide bar assembly means.

4. The apparatus of claim 3 including means for adjusting the vertical distance between the strobe light attaching means and said slide bar.

5. The apparatus of claim 4 including means operably attached to said first member for checking the level of said first member.

6. The apparatus of claim 3 wherein said first member, slide bar and support means are all parallel with respect to each other and rigidly connected together.

7. The apparatus of claim 2 including a camera attached to said camera attaching means and a strobe light connected to said support means.

8. The apparatus of claim 1 including a camera attached to said camera attaching means.

9. The apparatus of claim 1, including a first stop means attached to said slide bar for preventing said slide bar assembly means from moving in a first direction beyond said first position thereof and a second stop means attached to said slide bar for preventing said slide bar assembly means from moving in a direction opposite to said first direction, beyond said second position thereof.

* * * * *